United States Patent [19]
Ueda

[11] Patent Number: 5,523,795
[45] Date of Patent: Jun. 4, 1996

[54] METHOD AND APPARATUS FOR SERIAL TRANSMISSION AND/OR RECEPTION OF NONSYNCHRONOUS, MULTIPLEXED SIGNALS

[75] Inventor: Mamoru Ueda, Kanagawa, Japan

[73] Assignee: Sony Corporation, Tokyo, Japan

[21] Appl. No.: 291,194

[22] Filed: Aug. 16, 1994

[30] Foreign Application Priority Data

Aug. 24, 1993 [JP] Japan .................................. 5-231019

[51] Int. Cl.⁶ .................. H04N 7/52; H04N 7/54
[52] U.S. Cl. ..................... 348/480; 348/472; 348/489; 348/434; 348/423; 348/515
[58] Field of Search ................................... 348/423, 434, 348/435, 480, 481, 482, 483, 484, 485, 479, 478, 477, 472, 462, 465, 464, 467, 512, 515, 516, 537, 432, 474, 473, 489, 495, 496, 517–519, 520, 524, 521, 546, 540, 536; 358/320, 339, 343; 370/112, 110.1, 111, 77, 100.1, 105.1; 375/354, 362; H04N 7/52, 7/54, 7/56, 7/60, 7/62, 7/04, 7/015

[56] References Cited

U.S. PATENT DOCUMENTS

| | | | |
|---|---|---|---|
| 3,755,624 | 8/1973 | Sekimoto | 348/479 |
| 3,988,528 | 10/1976 | Yanagimachi et al. | 348/481 |
| 4,542,406 | 9/1985 | Shimoyama et al. | 348/484 |
| 4,544,950 | 10/1985 | Tu | 348/485 |
| 4,706,109 | 11/1987 | Murray | 348/481 |
| 4,851,909 | 7/1989 | Noske et al. | 348/512 |
| 5,113,242 | 5/1992 | Tsinberg et al. | 348/489 |
| 5,138,440 | 8/1992 | Radice | 358/13 |
| 5,199,030 | 3/1993 | Ueda | 370/68 |
| 5,231,492 | 7/1993 | Dangi et al. | 348/423 |
| 5,287,182 | 2/1994 | Haskell et al. | 348/484 |

FOREIGN PATENT DOCUMENTS

0488225A2 11/1991 European Pat. Off. .......... H04J 3/06
0598295A1 11/1993 European Pat. Off. ......... H04N 7/13

OTHER PUBLICATIONS

SMPTE Journal, vol. 102, No. 10, Oct. 1993, Scarsdale, New York, U.S.A., pp. 905–909; K. Y. Reynolds, et al., "Multiplexing and Demultiplexing Digital Audio and Video in Today's Digital Environment".

4:2:2 Digital Video: Background and Implementation, 1989, SMPTE, White Plains, New York, U.S.A., pp. 77–82; K. P. Davies, "Some Concepts for the Digital Television Studio".

SMPTE Journal, vol. 102, No. 2, Feb. 1993, Scarsdale, New York, U.S.A., pp. 174–179; "Proposed SMPTE Standard 259M".

Signal Processing Image Communication, vol. 4, No. 2, May 1992, pp. 153–159; A. G MacInnis, "the MPG System Coding Specification".

Primary Examiner—Safet Metjahic
Attorney, Agent, or Firm—Limbach & Limbach

[57] ABSTRACT

A method and an apparatus capable of transmitting and receiving multiplexed signals as serial data in such a manner that, even in a state where a continuous signal such as an audio digital signal is not in synchronism with another signal such as a video digital signal, the continuous signal can be properly reproduced on a reception side. Address data based on a word clock of another digital signal is sampled on a transmission side in accordance with a sampling clock of the continuous signal, and the sampled address value is included in the multiplexed signals to be thereby transmitted together to the reception side. Then on the reception side, a word clock synchronously locked to the word clock of the transmission-side another digital signal is reproduced from the received serial data, and address data is generated on the basis of the reproduced word clock, so that the reception-side clock of the continuous signal is reproduced from the generated address data and the transmitted address value included in the multiplexed signals, whereby the continuous signal is reproduced in accordance with the clock thus reproduced.

11 Claims, 5 Drawing Sheets

METHOD AND APPARATUS FOR SERIAL TRANSMISSION AND/OR RECEPTION OF NONSYNCHRONOUS, MULTIPLEXED SIGNALS

BACKGROUND OF THE INVENTION

The present invention relates to a method and an apparatus for multiplexing, for example, a digital audio signal with a digital video signal by time division and transmitting and/or receiving such multiplexed signals as serial data, and more particularly, to a method and an apparatus capable of transmitting and/or receiving multiplexed signals even in a state where an audio signal is not synchronized with a video signal.

For transmission of a digital video signal, there is known an exemplary system employing a serial digital interface. According to this interface, a digital video signal is transmitted as 1-bit serial data. More specifically, there is proposed in the serial digital interface a technique in which a blanking period of the video signal is rendered vacant due to non-transmission of horizontal and vertical sync signals, and a digital audio signal is transmitted during such blanking period through time-base compression and multiplexing.

In U.S. Pat. No. 5,199,030, there is disclosed a method of multiplexing and transmitting a digital video signal and a digital audio signal.

The serial digital interface mentioned above has the merit that both a digital video signal and a digital audio signal can be transmitted via a single coaxial cable without signal deterioration, whereby the signal connection between various digital video apparatus can be remarkably simplified.

Generally, the sampling clock frequencies for the digital video signal and the digital audio signal are different from each other. For example, the sampling rate in the case of NTSC video signal is 14.3 MHz, whereas the rate for the audio signal is 48 kHz. The transmission clock rate for the audio signal is generally set to be equal to that for the digital video signal. Assuming in the above example that each sample is composed of 10 bits, it follows that the transmission rate is 143 Mbps. The audio data is compressed in its time base and is multiplexed to form data of the above transmission rate.

In this case, for reproducing the digital audio data, it is generally necessary that the sampling clock on the transmission side and that on the reception side are coincident with each other. However, an occurrence of a frequency error is practically unavoidable even by the use of quartz oscillators. For attaining synchronism between the clocks on the transmission and reception sides, it is customary in the prior art to adopt means of synchronizing, on the transmission side, the sampling clock of the audio data with the video signal while using, on the reception side, the vertical sync signal included in the received video signal, and locking the clock frequency of the video signal to the reproduced sync signal in the same manner as on the transmission side, thereby achieving satisfactory reproduction of the audio data.

When a digital audio signal is transmitted via a serial interface while being multiplexed by time division with a digital video signal as described above, the following three requisite relations need to be ensured.

(1) The transmission audio clock is synchronized with the transmitted video signal.

(2) The transmission video signal and the received video signal are synchronized with each other.

(3) The reception audio clock is synchronized with the received video signal. Due to the above requirements, there exists the following implicit precondition.

(4) The transmission audio clock and the reception audio clock are synchronized with each other.

If the conditions (1) to (4) described above fail to be satisfied, there arises some excess or deficiency of the data on the reception side due to the frequency difference between the transmission audio clock and the reception audio clock, whereby the original digital audio signal is not reproduced properly.

Therefore, in the conventional transmission system employing such a digital interface, it is impossible to transmit an audio signal not synchronized with a video signal.

However, in a practical operation, it is not exactly ensured that a desired relationship of synchronism is maintained between the digital video signal and the digital audio signal. For example, though in any broadcasting station a video signal and an audio signal are locked to sync signals of that station, such sync signals of that station may not always be synchronized with the signals of the other station, so that the above problem is raised in using a television signal of the other station.

Although it is possible to attain synchronism with respect to the video signal in this case by locking the same to a sync signal, there still remains a problem that the clock for the audio signal may fail to follow up exactly.

Further in any program employing a VTR, there may be selected, depending on the content of a broadcast, a program play mode where the broadcast is so adjusted as to be completed within a changed time shorter or longer than a normal reproduction time. Supposing now that the time is shortened by 5 percent for example, the audio clock frequency is also shifted to be higher by 5 percent to consequently cause a non-locked state.

SUMMARY OF THE INVENTION

It is therefore an object of the present invention to provide a method and an apparatus capable of performing serial transmission of multiplexed signals in such a manner that, even in a state where a transmission audio clock is not synchronized with a transmitted video signal as mentioned, a digital audio signal can be properly reproduced without the necessity of any process of correction on the reception side.

According to a first aspect of the present invention, there is provided a method for transmission of multiplexed signals as serial data obtained by multiplexing a first digital sample signal of a continuous signal with a second digital sample signal. The method comprises the steps of: generating an address based on a clock of the second digital sample signal; sampling the generated address by the use of a sampling clock of the continuous signal; and transmitting the multiplexed signals inclusive of the sampled address value inserted therein.

According to a second aspect of the present invention, the above method further comprises the steps of: reproducing, from the received serial data on the reception side, a first clock synchronized with the transmission-side clock of the second digital sample signal; generating address data on the basis of the reproduced clock; generating a second clock for reproduction of the continuous signal from both the generated address data and the address value separated from the received serial data; and reproducing the continuous signal in accordance with the generated second clock. In the above, the word clock of the second digital sample signal is equal to the word clock of the multiplexed signal. The continuous signal is an audio signal, and the second digital sample signal is a digital video signal, and the sample signal of the audio signal is multiplexed during the blanking period of the digital video signal.

According to a third aspect of the present invention, there is provided an apparatus for transmission of multiplexed signals as serial data obtained by multiplexing a first digital sample signal of a continuous signal with a second digital sample signal. The apparatus comprises: a circuit for generating an address based on a clock of the second digital sample signal; a circuit for sampling the generated address by the use of a sampling clock of the continuous signal; a circuit for inserting the sampled address value into the multiplexed signals; and a circuit for converting the multiplexed signals, where the address value is inserted, into serial data for transmitting the same.

According to a fourth aspect of the present invention, the above apparatus further comprises: a circuit for separating, on a reception side, the received serial data into the first digital sample signal of the continuous signal, the second digital sample signal and the address value; a circuit for reproducing a first clock synchronized with the clock of the second digital sample signal; a circuit for generating address data on the basis of the reproduced clock; a comparator circuit for comparing the generated address data with the address value of the received multiplexed signal; a circuit for generating a second clock for reproduction of the continuous signal on the basis of the output of the comparator circuit; and a circuit for reproducing the continuous signal in accordance with the generated second clock. In the above apparatus, the word clock of the second digital sample signal is equal to the word clock of the multiplexed signal. The continuous signal is an audio signal, and the second digital sample signal is a digital video signal, and the sample signal of the audio signal is multiplexed during the blanking period of the digital video signal.

According to a fifth aspect of the present invention, there is provided an apparatus for transmitting and receiving multiplexed signals as serial data obtained by multiplexing a first digital sample signal of a continuous signal with a second digital sample signal. The apparatus comprises: a circuit for generating a word address based on a word clock of the second digital sample signal; a circuit for sampling the generated word address in accordance with the sampling clock of the continuous signal; a circuit for inserting the sampled word address value into the multiplexed signals; a circuit for converting the multiplexed signals, where the word address value is inserted, into serial data for transmitting the same; a circuit for separating the received serial data into the first digital sample signal of the continuous signal, the second digital sample signal and the word address value; a circuit for reproducing the first word clock synchronized with the word clock of the second digital sample signal; a circuit for generating address data on the basis of the reproduced word clock; a comparator circuit for comparing the generated word address data with the word address value of the received multiplexed signal; a circuit for generating a second word clock for reproduction of the continuous signal on the basis of the output of the comparator circuit; and a circuit for reproducing the continuous signal in accordance with the generated second word clock. In this apparatus, the word clock of the second digital sample signal is equal to the word clock of the multiplexed signal. The continuous signal is an audio signal, and the second digital sample signal is a digital video signal, and the sample audio signal is multiplexed during the blanking period of the digital video signal.

In the present invention of the constitution mentioned above, the word clock for the second digital sample signal is reproduced in a synchronized state on the transmission and reception sides. And the address of the second digital sample signal is generated on the basis of such word clock.

The clock data relative to the multiplex continuous signal is transmitted in a state where the address value obtained by sampling the address of the second sample signal in accordance with the audio clock is included in the multiplexed signals. Consequently the audio clock, which represents the time point of sampling the address in accordance with the audio clock, is reproduced from both the address data reproduced on the reception side and the data of the transmitted address value. Therefore, even if the multiplex continuous signal is not in synchronism with the second sample signal, the clock for the continuous signal is properly reproducible on the reception side so that the continuous signal can be exactly reproduced.

The above and other features and advantages of the present invention will become apparent from the following description which will be given with reference to the illustrative accompanying drawings.

DESCRIPTION OF THE PREFERRED EMBODIMENTS

Hereinafter a preferred embodiment of the method and the apparatus of the present invention will be described with reference to an exemplary case of employing a serial digital interface which transmits serial data of a multiplexed signal obtained by multiplexing a digital audio signal with a digital high-definition video signal.

Figure 1:
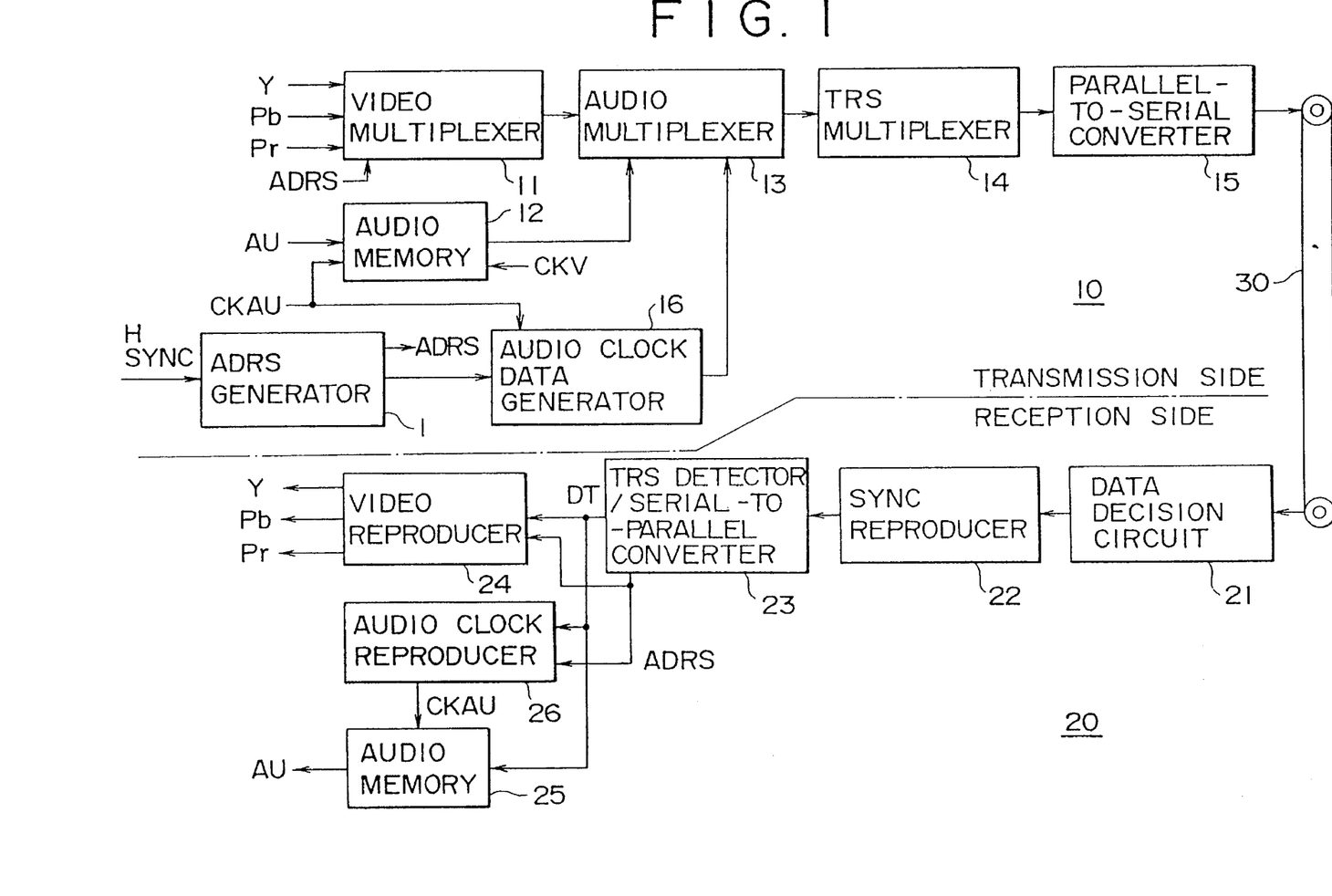
FIG. 1 is a block diagram of a preferred embodiment representing an apparatus of the present invention for transmission and reception of multiplexed signals.

FIG. 1 is a block diagram showing exemplary constructions of transmission and reception sides in the embodiment. In this diagram, a high-definition video signal of 1125/60 system (1 field=60 Hz, 1125 lines per frame=2 fields) is composed of a luminance signal Y and color difference signals Pb, Pr each converted into a 10-bit digital video signal in accordance with sampling clock pulses of 74.25 MHz and 37.125 MHz respectively.

Figure 2A:
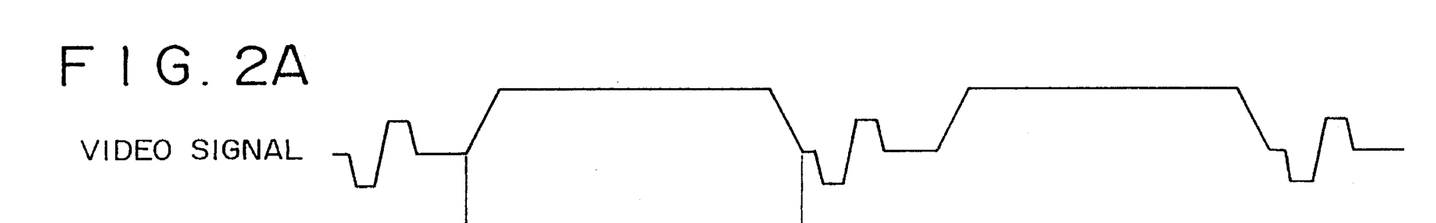
FIGS. 2A to 2D are timing charts of signals for explaining principal circuits in the present invention.
Figure 2B:
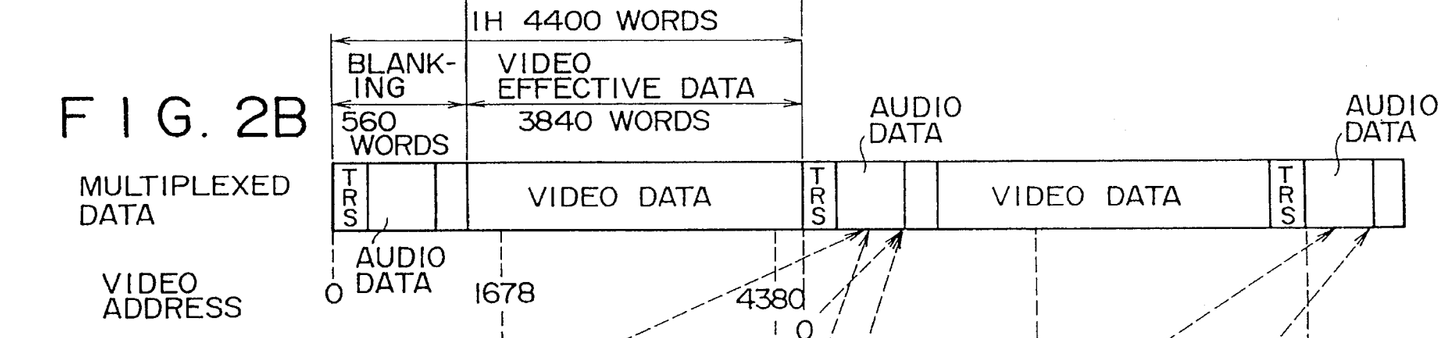
Figure 2C:
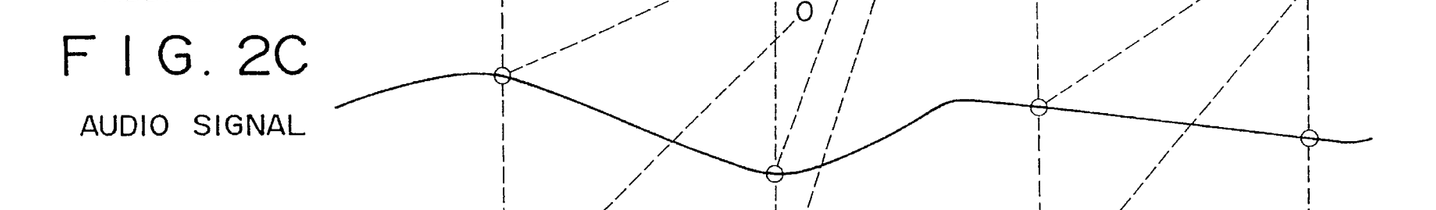
Figure 2D:
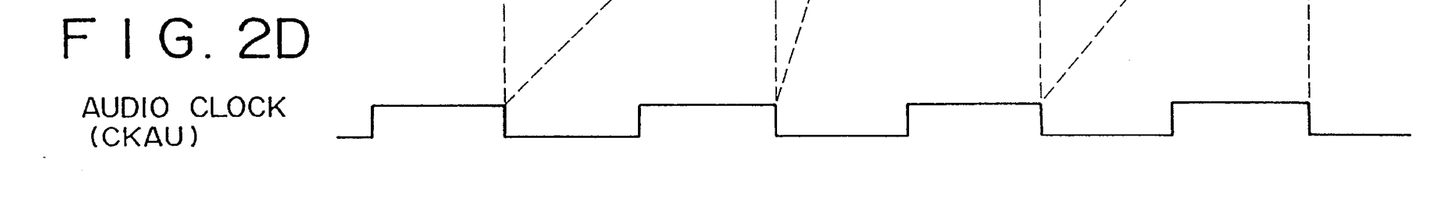

In this case, as shown also in FIG. 2B, a word address ADRS of the digital video signal is generated in a word address generator 1 with reference to a horizontal sync signal of the high-definition video signal shown in FIG. 2A. More specifically, in the word address ADRS of the digital video signal, one horizontal interval is determined as its repetition period and, as shown in FIG. 2B for example, the top address of the horizontal sync signal is 0, and the last address of the effective video data is 4399.

The digital video signal composed of respective words of the luminance signal Y and the color difference signals Pb, Pr is supplied to a video multiplexer 11 and is multiplexed in the order of Pb, Y, Pr, Y ... during the period of the video effective data shown in FIG. 2B, to be thereby formed into digital video data. Although not shown, the luminance signal and the color difference signals are distributed on the basis of the word address data ADRS.

As obvious from FIG. 2B, the horizontal sync signal of the video signal is not included in the transmitted data, and the video signal is the data except for the blanking period. More specifically, the transmitted video data is the effective data of a total of 3840 words including the luminance signal Y of 1920 words (1 word=10 bits) per horizontal interval and the color difference signals Pr and Pb each of 960 words per horizontal interval. The blanking period corresponds to 560 words.

Meanwhile the audio signal is converted into a digital audio signal AU composed of 24-bit words in accordance with an audio clock CKAU of, e.g., 48 kHz. The digital audio signal AU is written in an audio memory 12 in accordance with the audio clock CKAU.

The audio data AU is read out from the audio memory 12 during the blanking period of the high-definition video signal in accordance with the word clock CKV of the video signal, and then the audio data is time-division multiplexed in an audio multiplexer 13 with the video data obtained from the video multiplexer 11. In this stage of the operation, the audio data is compressed by time division on the basis of the frequency difference between the write clock and the read clock.

This embodiment is equipped with an audio clock data generator 16, to which the word address ADRS of the digital video data is inputted to be sampled in accordance with the audio clock CKAU.

In this case, approximately 1.5 words of the audio data are included in each horizontal interval since the sampling clock frequency of the audio signal is 48 kHz and one horizontal interval is approximately 30 μsec.

In the audio clock data generator 16, the word address ADRS of the video data is latched in accordance with the sampling clock CKAU of the audio data AU. And the value of the word address ADRS of the video data at the sampling time point of the latched audio word is supplied to the audio multiplexer 13 and then is inserted as data in the blanking period of the multiplexed data shown in FIG. 2B.

Figure 3:
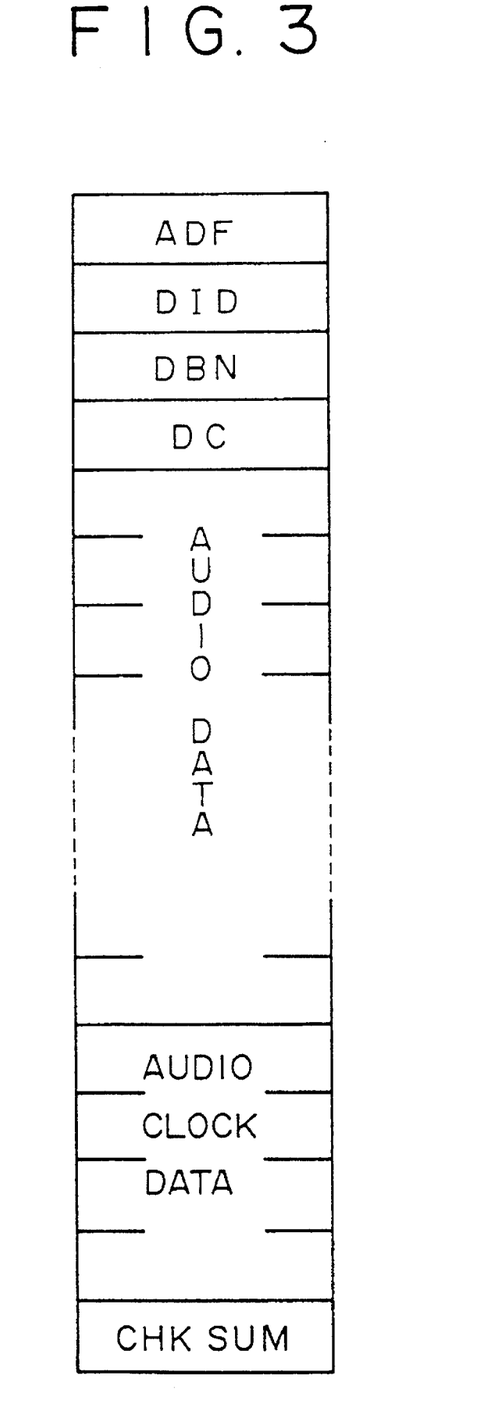
FIG. 3 illustrates an exemplary format of signals multiplexed in the present invention.

FIG. 3 shows a format of the data to be multiplexed by time division as ancillary data (auxiliary data) during the blanking period.

In FIG. 3, the first word "ADF" denotes an ancillary data flag which is used for identifying the data inserted in the blanking period, thereby indicating a start of the ancillary data. A next word "DID" denotes identification data signifying the kind of the ancillary data to make a discrimination as to whether the relevant ancillary data is audio data or some other data. A subsequent word "DBN" denotes a data block number which is serial in a packet during succession of audio data. And a jump of the number indicates a joint of the audio signal.

The following "DC" (data count) denotes information signifying the number of words of the ancillary data inserted in one packet. And audio data is inserted posterior to the data DC. In this example, the audio data is followed by the aforementioned audio clock data, i.e., the address data of the video data at the time point of the sample word of each digital audio signal. The last "CHK SUM" denotes a check sum covering from the data DID to the audio clock data and is used for error detection.

Thus the audio signal is multiplexed with the video signal as described, and further the address data of the video word is multiplexed as the clock data for the audio data to form multiplexed data, which is then supplied from the audio multiplexer 13 to a TRS multiplexer 14. In this multiplexer 14, there is multiplexed a timing reference signal (TRS) indicative of synchronization timing or the like anterior to the ancillary data in the blanking period.

The output of the TRS multiplexer 14 is parallel data where each word is composed of 10 bits. The word clock for such parallel data is the one for high-definition video data.

This parallel data is supplied to a parallel-to-serial converter 15, where the 10-bit parallel data of 148.5 MHz is converted into 1-bit serial data of 1.485 GHz. The data thus converted is outputted to a coaxial cable 30 and so forth, through which the multiplexed data is transmitted from the transmission side 10 to the reception side 20.

On the reception side 20, a sync reproducer 22 including a data decision circuit 21 and a PLL circuit reproduces the serial data of 1.485 GHz and the bit clock from the received signal. A TRS detector/serial-to-parallel converter 23 in the next stage detects the timing reference signal (TRS) to reproduce the word sync signal and then converts the 1-bit serial data of 1.485 GHz into parallel data DT of 148.5 MHz where each word is composed of 10 bits.

In the converter 23, the word address ADRS of the video data is reproduced from the word sync clock obtained from the sync reproducer 22. And the parallel data DT is supplied from the converter 23 to a video reproducer 24, where the luminance signal Y and the color difference signals Pb, Pr are reproduced on the basis of the word address ADRS.

The parallel data DT is supplied also to an audio memory 25, where the audio data in the blanking period is written and stored. Meanwhile the parallel data DT is further supplied to an audio clock reproducer 26, which then reproduces the word address corresponding to the timing of the audio clock in the blanking period.

To the audio clock reproducer 26, there is supplied the word address ADRS of the video data thus reproduced, so that the word address relative to the reproduced audio clock and the word address ADRS of the reproduced video data are compared with each other, and a clock pulse is obtained at the time of coincidence thereof. Then the clock pulse is supplied to, e.g., the PLL circuit to thereby reproduce the audio clock CKAU equal to the stable transmission-side clock. Subsequently the clock CKAU is supplied to the audio memory 25, from which the audio data is read out. Thus, the audio data can be read out without any excess or deficiency on the reception side to be thereby reproduced properly.

Figure 4:
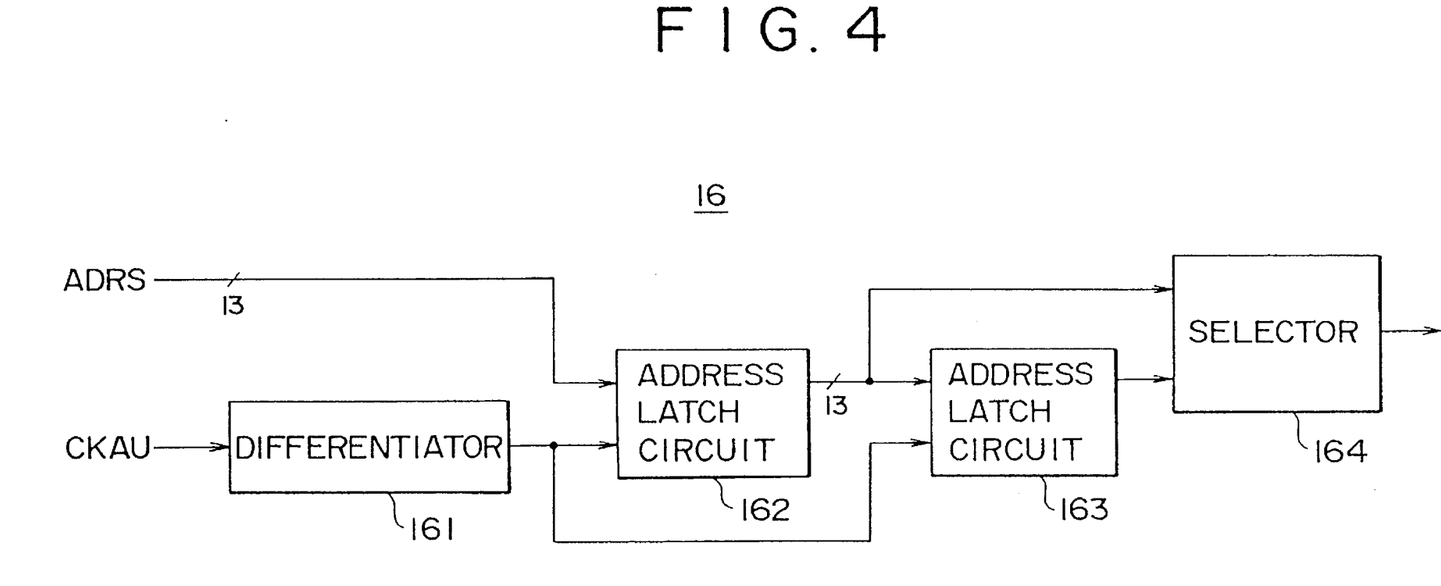
FIG. 4 is a block diagram of principal circuits on the transmission side of the embodiment shown in FIG. 1.

FIG. 4 is a block diagram of the audio clock data generator 16 employed on the transmission side 10.

As shown in this diagram, the audio clock CKAU from the transmission side is supplied to a differentiator 161, where a differential pulse is obtained at the sampling time point corresponding to, e.g., the fall or trailing edge. The differential pulse thus obtained is then supplied to address latch circuits 162 and 163.

Meanwhile the word address signal ADRS of the digital video data is supplied to the address latch circuit 162. The address latch circuits 162 and 163 are in cascade connection to serve as a shift register where an address value is transferred to the latter-stage latch circuit in response to each clock pulse.

In the construction described above, the word address ADRS of the digital video data at the timing of the audio clock CKAU is sequentially latched by the address latch circuits 162 and 163, and then is supplied via a selector 164 to the audio multiplexer 13, where the word address ADRS is inserted and multiplexed in the blanking period as mentioned.

Figure 5:
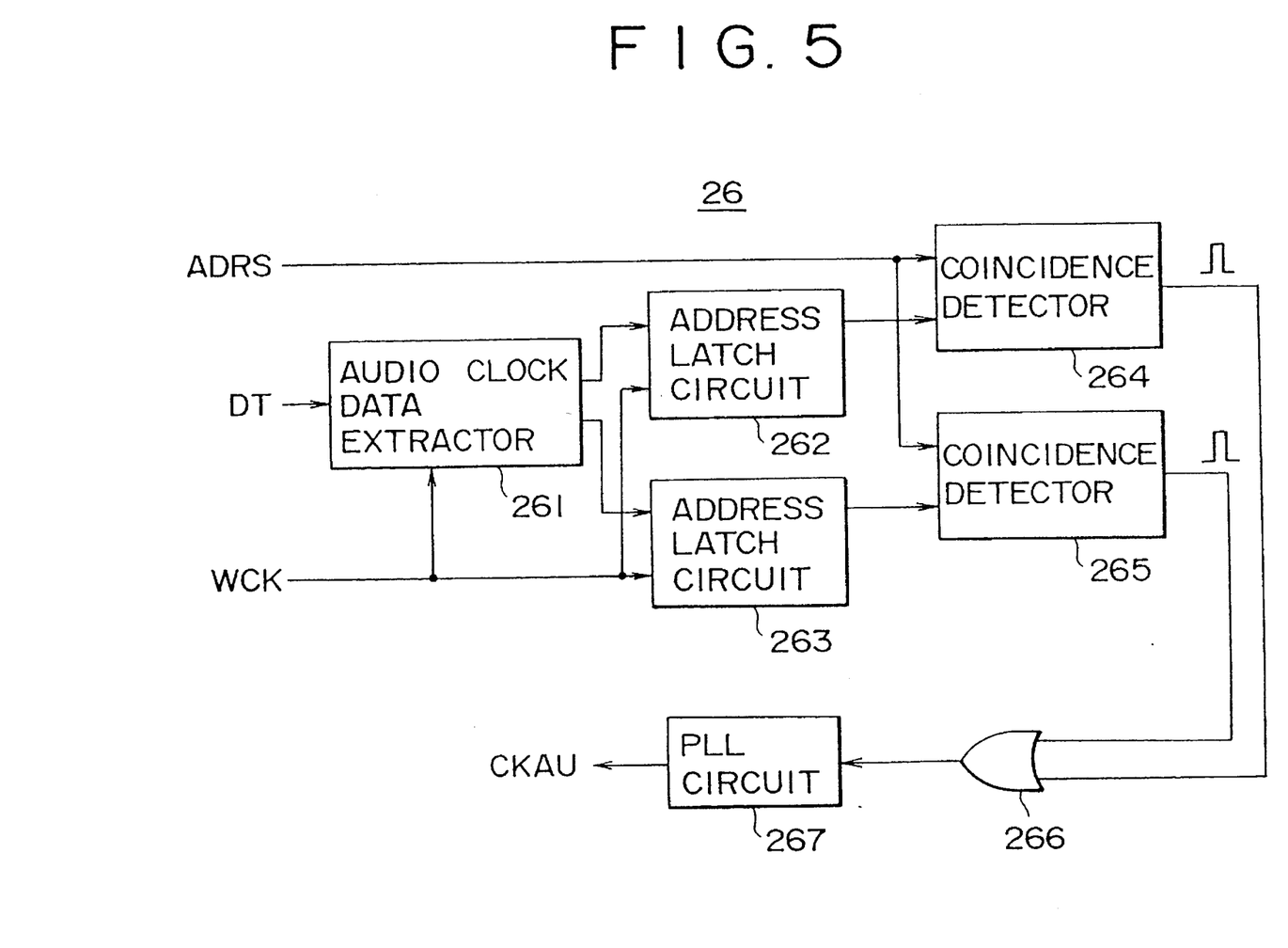
FIG. 5 is a block diagram of principal circuits on the reception side of the embodiment shown in FIG. 1.

FIG. 5 is a block diagram showing an exemplary construction of the audio clock data reproducer 26 employed on the reception side 20.

The parallel data DT outputted from the converter 23 is supplied to an audio clock data extractor 261, to which a word clock WCK is also supplied from the converter 23. Consequently the word address data of the video data relative to the audio clock inserted in the blanking period is extracted and then is held by address latch circuits 262 and 263.

The address value of the video signal at the time point of each audio clock held by the address latch circuits 262 and 263 is supplied to coincidence detectors 264 and 265, which are also supplied with the word address signal ADRS of the reception-side digital video data. And upon coincidence between the word address data obtained from the latch circuits 262, 263 and the input word address data ADRS, coincidence detection pulses are generated from the coincidence detectors 263 and 265. Such pulses are supplied via an OR gate 266 to a PLL circuit 267 so that the audio clock CKAU is reproduced.

The provision of such a PLL circuit 267 is based on the following reason. Since the audio clock data is equal to the data obtained by sampling the original transmission-side audio clock CKAU in accordance with the video clock, the audio clock data includes some jitters of the video clock period (6.734 nsec). Consequently the clock pulse obtained via the OR gate 266 includes such a jitter component. Therefore the PLL circuit 267 is employed to acquire a jitterless clock CKAU.

In this embodiment, as described above, a jitterless audio clock is generated through the PLL circuit 267 on the reception side so as to eliminate the jitter component caused by sampling the audio clock in accordance with the video clock. However, the jitter is permissible to some extent depending on the purpose of use. In such a case, therefore, the output of the OR gate 266 may be used directly as the audio clock.

Thus, in this embodiment where the reception-side audio clock is generated by utilizing the address data of the video data relative to the audio clock multiplexed with the transmission data, there occurs neither excess nor deficiency of the data in the reception-side audio memory even if the audio clock on the transmission side is not in synchronism with the video signal, so that the audio signal can be reproduced properly without any disadvantage.

It is to be noted in the above embodiment that the audio signal is not limited to one channel alone, and signals of two or more channels may be transmitted within a range of the blanking period during which multiplexing is performed.

Also in the above embodiment where the audio clock frequency is set to 48 kHz as an example, it is a matter of course that any other adequate frequency is applicable as well. Meanwhile the video signal described as an example is the one based on a 1125/60 high-definition television system. However, it is obvious that the present invention is further applicable to a component video signal of a 525/60 or 625/50 system, or to a video signal of any other television system such as NTSC or PAL.

Although the description has been given with regard to an exemplary case of multiplexing a video signal and an audio signal, the present invention is applicable to any multiplexed signals composed of a continuous signal and another signal.

The embodiment mentioned above represents an example where the continuous signal is an audio signal while the other sample signal is a digital video signal, and the audio signal is multiplexed by utilizing the blanking period of the video signal. Therefore the word clock used for such multiplexing is equal to the word clock of the video data. However, in case the other sample signal is a continuous signal, its time base is compressed and a vacant period is prepared for multiplexing the continuous signal.

In this case, the word clock of the other sample signal and the word clock used for multiplexing are different in frequency from each other. But if the word clock of the other sample signal is synchronously locked on both the transmission side and the reception side, the reception-side clock of the continuous signal can be reproduced in the same manner as mentioned by inclusively transmitting, together with the multiplexed signals, the address value obtained by sampling the address data, which is based on the word clock of the other sample signal, in accordance with the clock of the continuous signal. It is a matter of course that, in this case also, the address value obtained by sampling the address data, which is based on the word clock for multiplexing, in accordance with the clock of the continuous signal, may be included in the multiplexed signals so as to be transmitted therewith.

As described hereinabove, in the present invention for transmission of multiplexed data formed by time-division multiplexing a continuous signal with another signal, the word address data of signal reproducible on the reception side is sampled in accordance with the clock signal of the multiplex continuous signal, and the address data thus sampled is inserted into the multiplexed signals to be thereby transmitted together. Consequently, even if the continuous signal is not in synchronism with another signal on the transmission side, the clock of the continuous signal is accurately reproducible from the transmitted address data, whereby the continuous signal can be properly reproduced on the reception side.

What is claimed is:

1. A method for transmission of multiplexed signals as serial data obtained by multiplexing a first digital sample signal of a continuous signal with a second digital sample signal, said method comprising the steps of:

generating an address based on a clock signal of said second digital sample signal;

sampling the generated address by the use of a sampling clock signal of said continuous signal to produce a sampled address value; and transmitting the multiplexed signals inclusive of the sampled address value inserted therein.

2. The method according to claim 1, further comprising the steps of:

receiving serial data on a reception side and reproducing, from the received serial data, a first clock signal synchronized with a transmission-side clock signal of said second digital sample signal;

generating address data on the basis of the reproduced first clock signal;

generating a second clock signal for reproduction of said continuous signal from both the generated address data and an address value separated from the received serial data; and reproducing said continuous signal in accordance with the generated second clock signal.

3. The method according to claim 1, wherein a word clock signal of said second digital sample signal is equal to a word clock signal of the multiplexed signals.

4. The method according to claim 1, wherein said continuous signal is an audio signal, and said second digital sample signal is a digital video signal, and the sample signal of said audio signal is multiplexed during a blanking period of said digital video signal.

5. An apparatus for transmission of multiplexed signals as serial data obtained by multiplexing a first digital sample signal of a continuous signal with a second digital sample signal, said apparatus comprising:

a circuit for generating an address based on a clock signal of said second digital sample signal;

a circuit for sampling the generated address by the use of a sampling clock signal of said continuous signal to produce a sampled address value;

a circuit for inserting the sampled address value into said multiplexed signals; and a circuit for converting said multiplexed signals, where the address value is inserted, into serial data for transmitting the same.

6. The apparatus according to claim 5, further comprising:

a circuit for receiving serial data and separating, on a reception side, the received serial data into said first digital sample signal of the continuous signal, said second digital sample signal and said address value;

a circuit for reproducing a first clock signal synchronized with the clock signal of said second digital sample signal;

a circuit for generating address data on the basis of the reproduced first clock signal;

a comparator circuit for comparing the generated address data with the address value of the received received serial data;

a circuit for generating a second clock signal for reproduction of said continuous signal on the basis of an output of said comparator circuit; and a circuit for reproducing said continuous signal in accordance with the generated second clock signal.

7. The apparatus according to claim 5, wherein a word clock signal of said second digital sample signal is equal to a word clock signal of said multiplexed signal.

8. The apparatus according to claim 5, wherein said continuous signal is an audio signal, and said second digital sample signal is a digital video signal, and the sample signal of said audio signal is multiplexed during the blanking period of said digital video signal.

9. An apparatus for transmitting and receiving multiplexed signals as serial data obtained by multiplexing a first digital sample signal of a continuous signal with a second digital sample signal, said apparatus comprising:

a circuit for generating a word address based on a word clock signal of said second digital sample signal;

a circuit for sampling the generated word address in accordance with the sampling clock signal of said continuous signal to produce a word address value;

a circuit for inserting the word address value into said multiplexed signals;

a circuit for converting said multiplexed signals, where the word address value is inserted, into serial data for transmitting the same;

a circuit for receiving the serial data and separating the received serial data into said first digital sample signal of the continuous signal, said second digital sample signal and said word address value;

a circuit for reproducing a first word clock signal synchronized with a word clock signal of said second digital sample signal;

a circuit for generating word address data on the basis of the reproduced first word clock signal;

a comparator circuit for comparing the generated word address data with the word address value of the received serial data;

a circuit for generating a second word clock signal for reproduction of said continuous signal on the basis of the output of said comparator circuit; and a circuit for reproducing said continuous signal in accordance with the generated second word clock signal.

10. The apparatus according to claim 9, wherein the word clock signal of said second digital sample signal is equal to the word clock signal of the multiplexed signal.

11. The apparatus according to claim 9, wherein said continuous signal is an audio signal, and said second digital sample signal is a digital video signal, and the sample signal of said audio signal is multiplexed during the blanking period of said digital video signal.

* * * * *